July 2, 1946.  M. N. YARDENY  2,403,161
REMOTE CONTROL APPARATUS
Filed Jan. 17, 1942
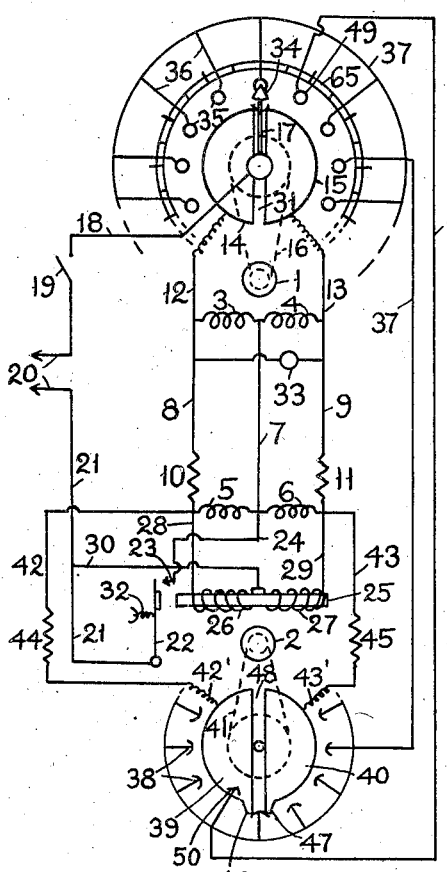
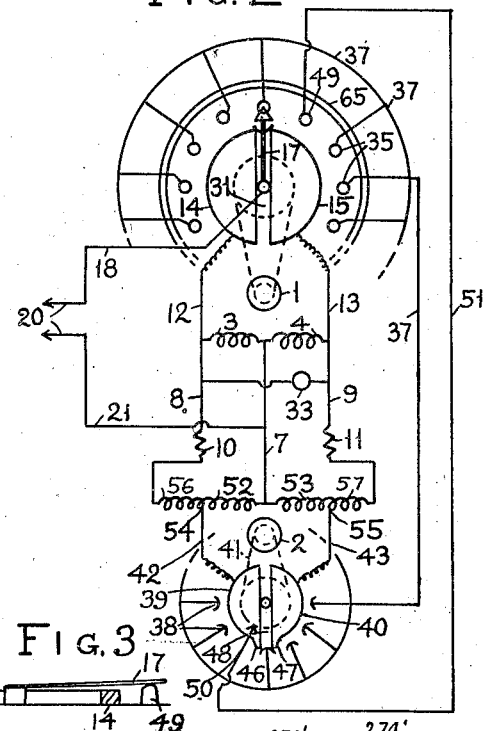
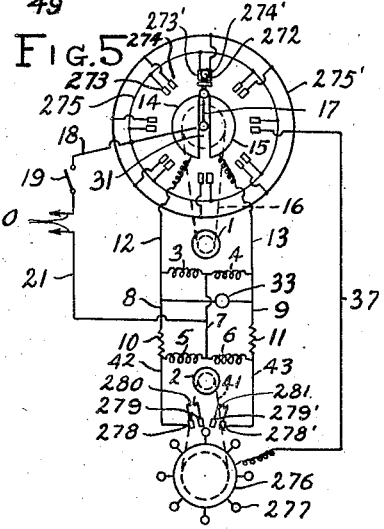
Michel N. Yardeny
INVENTOR.
BY John P. Nissonow
ATTORNEY Patented July 2, 1946

2,403,161

UNITED STATES PATENT OFFICE 2,403,161

REMOTE-CONTROL APPARATUS

Michel N. Yardeny, New York, N. Y.

Application January 17, 1942, Serial No. 427,094

14 Claims. (Cl. 172—239)

My invention relates to remote control apparatus and has particular reference to control apparatus and systems employing electric motors.

One of the principal objects of my invention is to provide a system in which an electric motor can be controlled at a distance in such a manner as to cause the motor to stop in any desired position. The controlled motor for this purpose is electrically connected with a controlling motor at a point of control, the controlling motor being operated by my control device employing relatively movable conducting segments and a contactor or contactors. I also provide means to correct the synchronous rotation of the two motors at certain intervals so that with my system it is not necessary to employ fully synchronous motors and any motors can be used with an approximately similar rotational speed.

Although any D. C. or A. C. motors can be used with my system, I prefer to use motors having reversing windings, particularly A. C. single phase induction squirrel-cage reversible motors, so that they can be effectively stopped and braked by opposing electromotive forces when both windings are connected with a source of current. I also provide means to start rotation of both motors when the control elements are placed in a new position.

Another object of my invention is to provide a remote control system in which a motor is operated at a distance in a step-by-step movement, following corresponding step-by-step movements of a control device. In order to reduce the steps to any desired degree of fineness, I operate the control device through step-down gears with a large reduction ratio so that the control contactor will make one complete revolution for a relatively small displacement of an indicating or manually operated handle, thereby obtaining practically continuous rotation. Similar reduction gears are provided at the controlled point, the latter gears being of a reverse type, i. e., step-down, for rotating the controlled device at a greatly reduced speed.

Another object of my invention is to provide an arrangement for a remote control of a predetermined position type, in which a few wires can be used for any desired number of operating positions of the controlled motor. I also provide for this system means to restart the motor when the control device is placed in a new position.

Still another object of my invention is to provide means periodically to correct the exact correlation between the controlled motor and the control device at the control point, so that when the controlling motor is stopped, the controlled motor may continue rotation until it comes to a correct position corresponding to the position of the control handle.

A further object of my invention is to provide a remote control system of a predetermined position type with several contactors and corresponding conducting segments, a single wire being brought out for every contactor, thereby simplifying the wiring and installation of the system.

I also provide means to suppress and stop oscillations of the motor armature and connected devices when the motor is stopped.

My invention is more fully described in the accompanying specification and drawing, in which:

Fig. 1 is a diagrammatic view of one form of my invention in which two motors are synchronously rotated for continuous remote control, the synchronism of the motors being corrected and reestablished at spaced intervals;

Fig. 2 is a similar view of a modified system;

Fig. 3 is a detail view of contacting members;

Fig. 4 is a diagrammatic view of a modified control system;

Fig. 5 is a view of another modification.

My remote control system as shown in Fig. 1 comprises two electric motors 1 and 2 placed respectively at controlling and controlled points. The motors may be of any suitable type, D. C. or A. C., provided that they have reversing field windings 3, 4 and 5, 6, respectively, windings 3 and 5 being connected for rotation in one direction, the other windings being for the reverse direction. It is therefore possible to dynamically brake and stop the motors by simultaneously energizing both sets of windings, thereby creating opposing electromotive forces or electromagnetic fields, preventing rotation of the armatures. I have found that ordinary commercial single phase reversible induction motors having reversing windings can be effectively braked by energizing both windings, and that they will resist further rotation. This applies to motors having reversing windings with short circuited shading coils or rings, as well as with shading windings without short circuited rings, and to the motors having dephasing resistors or capacitors. I have also found that such motors have a sufficient starting torque for operating such devices as tuning elements of radio receivers and transmitters. Common taps of the windings 3, 4 and 5, 6 are connected together by a lead 7, the free ends of these windings being connected together by leads 8, 9 through resistance or impedance elements 10, 11. The windings are also connected by leads 12, 13 with a rotary member having two insulated conducting parts or segments 14, 15, connected with the motor 1 by a suitable transmission, such as a chain 16 or, preferably, suitable gears, and separated by a gap 31 adapted to be bridged by the contactor 17. The contactor 17 is mounted for rotation coaxially with the segments and can be rotated manually or by other suitable means. The contactor slides over the segments and is connected by a lead 18 through a suitable switch 19 with one terminal of a source of current 20. The other terminal of the source of current is connected by a lead 21, relay switch 22, contact points 23 and lead 24 with the common tap of the windings 5, 6. The relay magnet 25 has two opposing windings 26, 27 connected at the ends with the ends of the windings 5, 6 by leads 28, 29, the common tap being connected by a lead 30 with the lead 21. A retrieving spring 32 keeps the arm 22 away from the point 23. A lamp 33 is included in the circuit to indicate when the motors are running. It is lighted when only one of the windings 3, 4 is energized.

With my system it is possible to use ordinary motors, not necessarily of a synchronous type. In order to maintain and to periodically correct their synchronism, I provide additional synchronism establishing circuits as shown in Fig. 1. The contactor 17 is extended for this purpose, having an added contact head 34, slidably engaging contact points 35, 35, located in a circle concentric with the axis of the contactor. The points 35, 35 are connected by leads 36 with a common lead 37, the latter extending to the controlled point and being connected with correspondingly positioned contact points 38, 38, supported around a rotary member having conducting members or segments 39, 40, the latter being connected by flexible leads 42', 43', leads 42, 43 and impedance elements 44, 45 with the ends of the windings 5 and 6. The rotary member is connected to motor 2 by a suitable transmission 41 which in this particular example is so arranged that the rotary member always turns in a direction opposite to direction of rotation of the contactor 17. The points are spaced from the segments but can touch projections or conducting portions 46, 47, the projections and segments being separated by a gap 48. The width of one projection is equal to or more than the error in movement of the second motor between two consecutive points 38. The total width of the two projections must preferably be less than the distance between two consecutive points 38, so that only one point can touch the projections at one time.

The operation of my device is as follows:

When the contactor arm 17 is moved from its neutral position, as, for instance, to the right in Fig. 1, contacting the segment 15, a closed circuit is established through the lead 13, lead 9, impedance element 11, lead 29, relay coil 27, leads 30 and 21 to one terminal of the source of current 20, then from the other terminal through the lead 18 and switch 19 to the contactor 17. The magnet 25 is energized, attracting the arm 22 and closing the circuit for the two motors through the leads 7, 24, 22, and 21 and two windings 4 and 6. The motor 1 will rotate clockwise, that is in the direction for causing the gap 31 to follow the displaced contactor 17 to the right. The motor 2 will also rotate for moving the points 46, 47 on the rotary member to the right, i. e. counterclockwise. When the contactor 17 is stopped, the motor 1 will bring the gap 31 into register with the contactor until the gap is bridged, admitting current to both sets of windings 3, 4 and 5, 6. The windings will produce opposing electromotive forces in the armatures, effectively braking and stopping rotation, or, with direct current motors, the windings will be deenergized.

The relay will be demagnetized when the motors are stopped because the windings 26, 27 are wound in opposition to each other. The arm 22, therefore, will be retracted by the spring 32, disconnecting the circuit at 23. The relay is preferably provided with windings having relatively high inductance in order to delay its action until the motors are fully stopped, and to decrease current consumption of the system.

The motors are stopped when the gap reaches the contact point, but they will be immediately reversed if the gap passes beyond the contactor. In order to suppress or prevent oscillations or hunting of the system at this point, flexible couplings may be employed in different parts of the device, preferably in different stages of the transmissions. The hunting of the motors is also largely suppressed by the provision of the impedances in the circuits.

The contactor 17 may be made to rotate over the entire circle or 360°, a dial 65 being provided calibrated in any suitable units of measurement.

The operation of the synchronizing arrangement is as follows.

If switch 19 is closed and the contactor arm 17 is moved (manually or otherwise), for instance, to the right, thereby engaging segment 15, current will pass from one terminal of the source of current 20 through switch 19, lead 18, contactor 17, segment 15, leads 13, 9, impedance 11, lead 29, relay coil 27, leads 30, 21 to the other terminal of the source of current 20. The relay will be energized, attracting the arm 22 and causing it to engage the contact point 23. Current will then flow from the lead 13 also through the winding 4 of the motor 1, leads 7, 24, point 23, arm 22, and lead 21 to the terminal of the source of current. The motor 1 will therefor rotate causing the gap 31 to follow the contactor 17 to the right. Current will further pass from the lead 13 through the lead 9, impedance 11, winding 6 of the motor 2, lead 24, point 23, arm 22, lead 21 to the terminal of the source of current. The motor 2 will rotate for moving the points 46, 47 on the rotary member also to the right, i. e. in a counterclockwise direction. When the arm 17 reaches the next point 35 and the gap 31 is bridged in this position, the motor 1 will be stopped by its windings 3 and 4, these windings being energized as it was explained above. The gap 48 may lag behind, however, if the motor 2 is overloaded, for instance. With a relatively large number of points 38, the lag in the speed of the motor 2 between the two consecutive points 38 will be relatively small, not exceeding the width of the points 46 and 47, so that the point 47 will be engaging the next point 38 when the gap 31 is bridged. As a result, the relay will remain energized, although its both coils 26 and 27 are equally energized through the impedances 10 and 11, because the coil 27 will receive a stronger current than coil 26. This current will flow through the contactor 17, point 35, lead 37, engaged point 38, point 47, lead 43', impedance 45, leads 43, 29, coil 27, and leads 30, 21 to the terminal of the source of current, the impedances 44 and 45 being smaller than the impedances 11 and 10. The arm 22 will therefore continue to engage the point 23 so that the winding 6 of the motor 2 will be also energized by a current passing from the lead 37, points 38, 47, lead 43', impedance 45, winding 6, lead 24, point 23, arm 22, and lead 21 to the terminal of the source of current 20. Hence the motor 2 will continue to rotate until the gap 48 is also bridged by the point 38. The two motors will be therefore brought into the same angular positions although their speeds may be slightly different. Such correction of the angular positions will be effected every time the contactor 17 reaches one of the points 35.

Usually, because of the load conditions, the motor 2 lags more or less behind the motor 1, but the described synchronizing arrangement is equally effective if the motor 2 rotates faster than the motor 1. Thus if the gap 48 is bridged by the next point 38 and the gap 31 has not yet reached the corresponding point 35, the relay will remain magnetized because the current through its coils will be unbalanced, the coil 26 being energized through the bridged gap 48, the coil receiving its current through two impedances 44 and 45 in series while the coil 27 will be energized through a single impedance 11. The motors therefore will continue rotation until the gap 31 is bridged and the motor 1 is stopped. The gap 48 will then be on the other side of the corresponding contact point 38, the point 46 being then energized. As a result, the winding 5 of the motor 2 will be energized, causing the motor 2 to reverse its rotation and to return the gap 48 into engagement with the point 38.

An additional synchronizing means may be provided for correcting the position of the motor 2 if it should be accidentally displaced for an angular distance, greater than the distance between two successive points 38. This is accomplished by a contact brush or arm 50 which engages the segments 39 or 40 and is connected by an independent lead 51 to a separate contact point 49 that is not connected to the lead 37. For correcting the relative angular positions of the two motors, the contactor 17 is placed on the contact point 49, causing the motors to rotate until the gap 31 is bridged and the motor 1 is stopped, as explained above, current passing through both the windings 3 and 4 of the motor 1, and windings 5 and 6 of the motor 2. An increased current will flow, however through the relay coil 27, as was explained above, through the segment 40, energized by the lead 51, through the lead 43', resistor 45, leads 43 and 29, coil 27, and leads 30 and 21 to the source of current. The motor 2 will continue its rotation until the gap 48 is bridged by the point 50. The gap 48 may pass during this synchronization over several points 38 but the motor 2 will not be stopped thereby since no reversal of current will take place when the gap overruns by inertia a non-energized point 38.

If desired, the gap 31 may be made larger than the contactor 17, and the gap 48 larger than the contact point 38, in which case the motors will be stopped by being disconnected from the circuit. The motor cannot continue rotation by inertia since its rotation will be immediately reversed and the respective gap returned into the neutral position with respect to the contactor or contact point. The impedance elements may be then omitted.

The point 49 can be made higher than the segments 14 and 15, as shown in Fig. 3, so that the contactor 17 will be resiliently raised above the segment when it touches the point 49. The segments are then disconnected, leaving the second motor free to rotate until the gap 48 is bridged. The impedance elements may be then omitted.

A modified system is shown in Fig. 2. It is similar to the system shown in Fig. 1, except that the segments 39, 40 are connected by leads 42, 43 with taps 54, 55 on the windings 52, 53, leads 8, 9 being connected through impedances 10, 11 with extensions 56, 57 of the windings 52, 53.

In the operation of this device, if the contact arm 17 is moved clockwise in Fig. 2 to a point 35, both the motors 1 and 2 will be rendered operative for moving both the gaps to the right, i. e. the gap 31 in a clockwise direction and the gap 48 also to the right, i. e. in a counterclockwise direction. The motor connections will be substantially the same as described in Fig. 1, current passing from one terminal of the source of current 20 through lead 18, contactor 17, segment 15, lead 13, winding 4, leads 7 and 21 to the other terminal of the source of current, causing the motor 1 to rotate; also from the lead 13 through the lead 9, resistor 11, windings 53, 57, and leads 7, 21 to the other terminal of the source of current, causing the motor 2 also to rotate. Motor 1 will be stopped when the gap 31 is bridged but the motor 2 will continue its rotation if the gap 48 is not yet bridged and the point 47 engages the corresponding contact point 38 because the winding 53 will then receive an increased current through contactor 17, the lead 37, point 47, segment 40, lead 43, winding 53, and leads 7 and 21 to the other terminal of the source of current 20. The current will be stronger because of the lower resistance of the single winding 53 as compared with both windings 53 and 56 in series. The special synchronizing contact points 49 and 50 are identical with similar contact points of Fig. 1.

Another modification is shown in Fig. 4, in which the segments 39, 40 are replaced by separate discs 58, 59 mounted on a shaft 60 of the second motor. The discs have projections 61, 62 successively engaging contact points 63, 64, 63', 64', etc., connected by a lead 37 with the corresponding contact points 35 as in Fig. 1. The contact members 63, 64, etc., are elongated, as shown, in order to maintain the contact with the projections 61, 62 when the motors 1 and 2 step out of synchronism between the successive points. The length of each member 63, 64, etc., is equal to or is larger than the possible error between the successive points. A dial 65 may be provided for the contact member 17 to indicate its position, the dial being calibrated in any desired units.

A modified system of continuous remote control with periodic correction of synchronization of the two motors is shown in Fig. 5, similar to the system shown in Fig. 1. The contactor arm 17 has an insulated extension contact point 272 sliding over contact points 273, 273', etc., and 274, 274', etc., for bridging them, the first set of the contact points being connected by a lead 275 to the lead 18, the second set being connected by a lead 275' to the lead 37 and to a rotor 276 connected by a transmission 41 to the motor 2. The rotor has contactors 277 electrically connected together and to the lead 37. The contactors slidably engage stationary conducting members 278, 278' and 279, 279', the members 278, 279 being connected together by an impedance element 280, the members 278', 279' being connected by a similar impedance (preferably resistance) element 281. The members 278, 278' are also connected by leads 42, 43 to the windings 5, 6 of the motor 2. When the contact point 272 is moved to the right for bridging the next pair of points 273', 274' and the gap 31 is bridged by the contactor 17, current will pass from one terminal of the source of current 20 through the switch 19, lead 18, contactor 17, segments 14, 15, leads 12, 13, windings 3 and 4, and leads 7, 21 to the other terminal of the source of current 20, causing the motor 1 to stop. At the same time current will pass from the leads 12, 13 through the leads 8, 9, impedances 10, 11, windings 5, 6 of the motor 2, and leads 7, 21 to the other terminal of the source of current. If the contact point 277 corresponding to the engaged points 273', 274' has not yet reached the gap between the points 279, 279', and only engages the point 278' (as shown in Fig. 5, the disc 276 rotates in a direction opposite to the direction of the movement of the contactor 17), the motor 2 will be then energized for continuing its rotation until the gap between the points 279, 279' is bridged. This is because a relatively strong current will pass from the lead 37 through the point 277, point 278', lead 43, winding 6, and leads 7 and 21 to the terminal of the source of current. This current will be stronger than the current passing through the winding 5 because the latter will receive its current from the point 277 through the two resistors 280, 281 connected in series. Thus the motor 2 will be automatically brought into an angular correspondence with the motor 1 every time the contactor 17 passes over or reaches a pair of the contact points 273', 274'.

It is understood that my remote control apparatus may be further modified without departing from the spirit of the invention, as set forth in the appended claims.

I claim as my invention:

1. A remote control apparatus comprising two reversible electric motors connected with a source of current for simultaneous rotation, means to control the rotation and stoppage of both motors in desired positions, said means including a movable contactor, a plurality of contact points at the first motor electrically connected together, the movable contactor being adapted to slidably engage the successive contact points, conducting members separated by a gap and operatively connected with the second motor, a plurality of contact points at the conducting members positioned correspondingly to the contact points at the first motor and electrically connected together, a lead connecting together the two sets of the contact points, and means to maintain rotation of the second motor when the first motor is stopped with the contactor at one of the contact points until the gap reaches the corresponding contact point at the second motor.

2. A remote control apparatus comprising two reversible electric motors connected with a source of current for simultaneous rotation, means to control the rotation and stoppage of both motors in desired positions, said means including a movable contactor, a plurality of contact points at the first motor electrically connected together, the movable contactor being adapted to slidably engage the successive contact points, conducting members separated by a gap and operatively connected with the second motor, a plurality of contact points at the conducting members positioned correspondingly to the contact points at the first motor and electrically connected together, a lead connecting together the two sets of the contact points, means to maintain rotation of the second motor when the first motor is stopped with the contactor at one of the contact points until the gap reaches the corresponding contact point at the second motor, and supplementary contact points at the first and second motors electrically connected together, the second motor being adapted to continue rotation after the first motor has stopped at its supplementary contact point until the second motor also reaches its supplementary contact point.

3. A remote control apparatus comprising two reversible motors the windings of one of the motors being electrically connected in circuit with the windings of the other motor, a pair of conducting members separated by a gap adapted to be rotated by the first motor and connected with the respective windings, a movable contactor slidably engaging the conducting members, connected in a circuit with the motors and adapted to be placed in any desired position, the motors being thereby adapted to rotate when the contactor is moved, and adapted to be stopped when the gap reaches the contactor, a rotary member operatively connected with the second motor, a contact point at the first motor, a corresponding contact point at the rotary member, the two points being connected together, and means to continue rotation of the second motor when the contactor reaches the first contact point until the rotary member reaches the second contact point.

4. A remote control apparatus comprising two reversible motors the windings of one of the motors being electrically connected in circuit with the windings of the other motor, a pair of conducting members separated by a gap adapted to be rotated by the first motor and connected with the respective windings, a movable contactor slidably engaging the conducting members, connected in a circuit with the motors and adapted to be placed in any desired position, the motors being thereby adapted to rotate when the contactor is moved, and adapted to be stopped when the gap reaches the contactor, a rotary member operatively connected with the second motor having two conductors separated by a gap and connected with the windings of the motors, a plurality of contact points around the conducting members electrically connected together, adapted to be successively engaged by the contactor, a plurality of corresponding contact points at the rotary member, the total width of the conductors of the rotary member being less than the distance between two adjacent contact points, and means to continue rotation of the second motor when the first motor is stopped at one of the contact points by the gap between the conducting members being bridged by the contactor until the gap of the rotary member is bridged by the corresponding contact point.

5. A remote control apparatus comprising two reversible motors the windings of one of the motors being electrically connected in circuit with the windings of the other motor, a pair of conducting members separated by a gap adapted to be rotated by the first motor and connected with its respective windings a plurality of contact points at the first motor, electrically connected together, a movable contactor slidably engaging the conducting members and the contact points, connected in a circuit with the motors and adapted to be placed in any desired position, the motors being thereby adapted to rotate when the contactor is moved, and adapted to be stopped when the gap reaches the contactor, a plurality of contact points at the second motor connected with the respective contact points of the first motor, rotary members operatively connected with the second motor adapted to successively engage the respective contact points when the contactor engages the gap in the first contact member, the line of contact between the rotary members and the contact points being relatively long, approaching the distance between the successive contact points, and means to continue rotation of the second motor when the first motor is stopped at one of the contact points until the rotary members move to position corresponding to the position of the contactor.

6. A remote control apparatus comprising two reversible motors the windings of one of the motors being electrically connected in circuit with the windings of the other motor, a pair of conducting members separated by a gap connected with its respective windings a plurality of contact points around the conducting members electrically connected together, a contactor slidably engaging the conducting members and the contact points, connected in a circuit with the motors and adapted to be placed in any desired position in relation to the conducting members, the motors being thereby adapted to rotate when the relative position of the contactor is changed, causing relative movement between the conducting members and the contactor and adapted to be stopped when the gap registers with the contactor, a member at the second motor having two conductors separated by a gap and connected with the windings of the motors a contactor at the second motor, a plurality of contact points around the conductors at the second motor electrically connected together, means to produce by the second motor a relative movement between the second contactor and the second conducting members and second contact points, the contact points being adapted to be successively engaged by the contactor one at a time, impedance elements included in the connections between the conducting members and the windings, and impedance elements between the respective windings of the first and second motors, the impedance elements being so adjusted as to enable the second motor to rotate when the first motor is stopped at one of the contact points, until the gap between the conductors is engaged by the corresponding contact point at the rotary member.

7. A remote control apparatus comprising two reversible motors the windings of one of the motors being electrically connected in circuit with the windings of the other motor, a pair of conducting members separated by a gap connected with its respective windings, a contactor slidably engaging the conducting members, connected in a circuit with the motors and adapted to be placed in any desired position, a stationary contact point engageable by the said contactor, means to produce relative movement by the first motor between the conducting members and the contactor, the motors being adapted to rotate when the relative position between the conducting members and the contactor is changed until the gap coincides with the contactor, a member at the second motor having two conductors separated by a gap and connected with the windings of the motors, a stationary contact point engageable by the said conductors and electrically connected to the said stationary contact point at the first motor means to change the relative position between the conductors and said stationary contact point at the second motor, and impedance elements included in the circuits of the two windings of the second motor, so adjusted as to enable the second motor to rotate when the first motor is stopped when the gap between the conducting members is engaged by the contactor until the gap between the conductors is engaged by a corresponding contact point.

8. A remote control apparatus comprising two reversible motors the windings of one of the motors being electrically connected in circuit with the windings of the other motor, a pair of conducting members separated by a gap adapted to be rotated by the first motor and connected with its respective windings, a movable contactor slidably engaging the conducting members, connected in a circuit with the motors and adapted to be placed in any desired position, the motors being thereby adapted to rotate when the contactor is moved, and adapted to be stopped when the gap reaches the contactor, a rotary member operatively connected with the second motor, having two conductors separated by a gap and connected with the ends of the windings of the second motor, a plurality of contact points at the first motor electrically connected together adapted to be successively engaged by the contactor, a plurality of correspondingly positioned electrically connected together contact points at the second motor the first and second control points being electrically connected together, the ends of the conductors being adapted to successively engage the contact points, impedances included in the leads extending from the ends of the windings of the second motor, the impedances being so adjusted as to cause the second motor to continue rotation when the first motor is stopped with the contactor engaging a contact point until the gap at the conductors is bridged by the corresponding contact point, and a contact arm slidably engaging the main bodies of the conductors and connected with a corresponding contact point at the first motor, the second motor being adapted to continue rotation when the first motor is stopped at the additional contact point until the gap between the conductors is bridged by the contact arm.

9. A remote control apparatus comprising two reversible motors, the windings of one of the motors being electrically connected in circuit with the windings of the other motor, a pair of conducting members separated by a gap adapted to be rotated by the first motor, the members being connected with the respective windings of the first motor, a movable contactor slidably engaging the conducting members, the contactor being connected in a circuit with the motor and a source of current and adapted to be placed in any desired position, the motors being thereby adapted to rotate when the contactor is being moved, and adapted to be stopped when the contactor is stopped and is reached by the gap, a rotary member operatively connected with the second motor comprising two conducting segments separated by a gap and connected with the ends of the windings of the second motor, a contact point at the first motor adapted to be engaged by the contactor, and a corresponding contact point at the second motor slidably engaging the rotary member, the two contact points being connected together, the second motor being thereby adapted to continue rotation when the first motor is stopped by the contactor reaching the first gap until the second contact point reaches the gap in the rotary member.

10. A remote control apparatus comprising two reversible motors, the windings of one of the motors being electrically connected in circuit with the windings of the other motor, a pair of conducting members separated by a gap adapted to be rotated by the first motor, the members being connected with the respective windings of the first motor, a movable contactor slidably engaging the conducting members and adapted to bridge the gap, the contactor being connected in a circuit with the motor and a source of current and adapted to be placed in any desired position, the motors being thereby adapted to rotate when the contactor is being moved, and adapted to be stopped when the contactor is stopped and is reached by the gap, a rotary member operatively connected with the second motor comprising two conducting segments separated by a gap and connected with the ends of the windings of the second motor, a contact point at the first motor adapted to be engaged by the contactor, a corresponding contact point at the second motor slidably engaging the rotary member and adapted to bridge the gap, the contact points being connected together, the second motor being thereby adapted to continue rotation when the first motor is stopped by the contactor bridging the gap until the second contact point bridges the gap in the rotary member, and means to start the first motor when the second gap is bridged.

11. A remote control apparatus comprising two reversible motors, the windings of one of the motors being electrically connected in circuit with the windings of the other motor, a pair of conducting members separated by a gap adapted to be rotated by the first motor, the members being connected with the respective windings of the first motor, a movable contactor slidably engaging the conducting members and adapted to bridge the gap, the contactor being connected in a circuit with the motor and a source of current and adapted to be placed in any desired position, the motors being thereby adapted to rotate when the contactor is being moved, and adapted to be stopped when the contactor is stopped and is reached by the gap, a rotary member operatively connected with the second motor comprising two conducting segments separated by a gap and connected with the ends of the windings of the second motor, a contact point at the first motor adapted to be engaged by the contactor, a corresponding contact point at the second motor slidably engaging the rotary member and adapted to bridge the gap, the contact points being connected together, the second motor being thereby adapted to continue rotation when the first motor is stopped by the contactor bridging the gap until the second contact point bridges the gap in the rotary member, and impedance elements included in the circuits of the conducting segments of the rotary member so adjusted as to enable the second motor to be started when the contactor engages one of the conducting members at the first motor.

12. A remote control apparatus comprising two reversible motors, the windings of one of the motors being electrically connected in circuit with the windings of the other motor, a pair of conducting members separated by a gap adapted to be rotated by the first motor, the members being connected with the respective windings of the first motor, a movable contactor slidably engaging the conducting members and adapted to bridge the gap, the contactor being connected in a circuit with the motor and a source of current and adapted to be placed in any desired position, the motors being thereby adapted to rotate when the contactor is being moved, and adapted to be stopped when the contactor is stopped and is reached by the gap, a rotary member operatively connected with the second motor comprising two conducting segments separated by a gap and connected with the ends of the windings of the second motor, a contact point at the first motor adapted to be engaged by the contactor, a corresponding contact point at the second motor slidably engaging the rotary member and adapted to bridge the gap, the contact points being connected together, the second motor being thereby adapted to continue rotation when the first motor is stopped by the contactor bridging the gap until the second contact point bridges the gap in the rotary member, and impedance elements included in the connections between the conducting segments of the rotary member and the windings of the first motor.

13. Apparatus for positioning from a control point a load at a remote point, comprising a reversible motor for moving the load, a pair of relatively movable members at the control point, one of the members having a contactor selectively adjusted to inaugurate directional rotation of the said load motor, a pilot motor connected to drive the other member of the said pair of relatively movable members in a direction to terminate said load motor rotation, means for coordinating rotation of said pilot and load motors, said means including a plurality of contact points adapted to be successively engaged by the said contactor, conducting members separated by a gap at the remote point and connected to be driven by the said load motor, and a plurality of contact points positioned about the said conducting members correspondingly to the said contact points at the control point and electrically connected thereto, and means to maintain rotation of the load motor when the pilot motor is stopped with the said contactor at one of the contact points at the control point until the gap separating the said conducting members at the remote point reaches the corresponding contact point at the remote point.

14. Apparatus for positioning from a control point a load at a remote point, comprising a reversible motor for moving the load, a pair of relatively movable members at the control point, one of the members having a contactor selectively adjusted to inaugurate directional rotation of the said load motor, a pilot motor connected to drive the other member of the said pair of relatively movable members in a direction to terminate said load motor rotation, means for coordinating rotation of said pilot and load motors, said means including a contact point adapted to be engaged by the said contactor, conducting members separated by a gap at the remote point and connected to be driven by the said load motor, and a contact point spaced relatively to the said conducting members correspondingly to the said contact point at the control point and electrically connected thereto, and means to maintain rotation of the load motor when the pilot motor is stopped with the said contactor at the said contact point at the control point until the gap separating the said conducting members at the remote point reaches the said contact point at the remote point.

MICHEL N. YARDENY.